United States Patent [19]
Johnson

[11] Patent Number: 5,094,747
[45] Date of Patent: Mar. 10, 1992

[54] REMOVAL OF POLYNUCLEAR AROMATIC COMPOUNDS FROM MOTOR VEHICLE FUEL

[75] Inventor: Alan B. Johnson, Attleboro, Mass.
[73] Assignee: Allied-Signal Inc., Morristown, N.J.
[21] Appl. No.: 584,234
[22] Filed: Sep. 18, 1990
[51] Int. Cl.[5] .............................................. B01D 35/02
[52] U.S. Cl. ..................... 210/266; 210/282; 210/416.4
[58] Field of Search ............ 210/266, 282, 283, 497.3, 210/497.5, 416.1, 416.4, 909, 168; 123/196 R, 196 A, 557

[56] References Cited
U.S. PATENT DOCUMENTS

| | | |
|---|---|---|
| 4,539,107 | 9/1985 | Ayers ................................ 210/416.4 |
| 4,795,556 | 1/1989 | Brotea et al. ....................... 210/266 |
| 4,810,379 | 3/1989 | Barrington ........................ 210/266 |
| 4,919,103 | 4/1990 | Ishiguro et al. ................... 123/557 |
| 4,977,871 | 12/1990 | Brownawell ..................... 210/282 |

OTHER PUBLICATIONS

Emission and Effluent Control, Patterson and Kodukala, CEP Apr. 1981, pp. 48-54.

Primary Examiner—Robert A. Dawson
Assistant Examiner—Wanda L. Millard
Attorney, Agent, or Firm—Ken C. Decker; William N. Antonis

[57] ABSTRACT

Polynuclear aromatic hydrocarbon compounds (PNAs) are removed from motor vehicle fuel by passing the fuel through a sorbent which is placed either in the fuel line between the fuel tank and the engine or in the filler tube through which the vehicle is fueled.

16 Claims, 2 Drawing Sheets

REMOVAL OF POLYNUCLEAR AROMATIC COMPOUNDS FROM MOTOR VEHICLE FUEL

This invention relates to a device for assuring the safe disposal of polynuclear aromatic hydrocarbon compounds commonly found in motor vehicle fuels.

Polynuclear aromatic hydrocarbon compounds (hereinafter referred to as "PNAs") have been recognized as a dangerous constituent of engine exhaust gasses and of used lubricating oil drained from motor vehicle engines. Used lubricating oil which contains a significant quantities of PNAs is difficult to dispose of in an environmentally safe manner, and such lubricating oil containing PNAs also poses a health hazard to mechanics and other workers which might come into contact with used lubricating oil. Accordingly, it is desirable to remove PNAs from used lubricating oil. As more fully described in prior art published European Patent Application 0 275 148, a sorbent is capable of absorbing PNAs from used lubricating oil. According to this prior art document, the sorbent may be included in the filter system which filters the lubricating oil of the engine. As disclosed in the prior art European Patent Application such sorbents may include clay, silica gel, molecular sieves, alumina or zeolite, although activated carbon is particularly preferred.

In practice, however, it was found to be difficult to include a sufficient amount of the activated charcoal in the engine filter system. However, it has been discovered that such a sorbent may be included in the fueling system of the motor vehicle, so that the PNAs are removed from the motor vehicle fuel before the fuel in combusted in the engine. Apparently, PNAs contained in motor vehicle fuel are not combusted in the engine, and enter the lubricating oil by washing down the cylinder walls past the piston rings after the fuel is combusted. Accordingly, by removing the PNAs from the fuel before the fuel reaches the engine, PNAs never have the opportunity of entering the engine lubricating oil. Furthermore, removing the PNAs from gasoline before it is combusted prevents emission of PNAs with the engine exhaust gasses.

These and other advantages of the present invention will become apparent from the following description, with reference to the accompanying drawings in which FIG. 1 is a schematic illustration of the fueling system of a motor vehicle engine;

Figure 3:
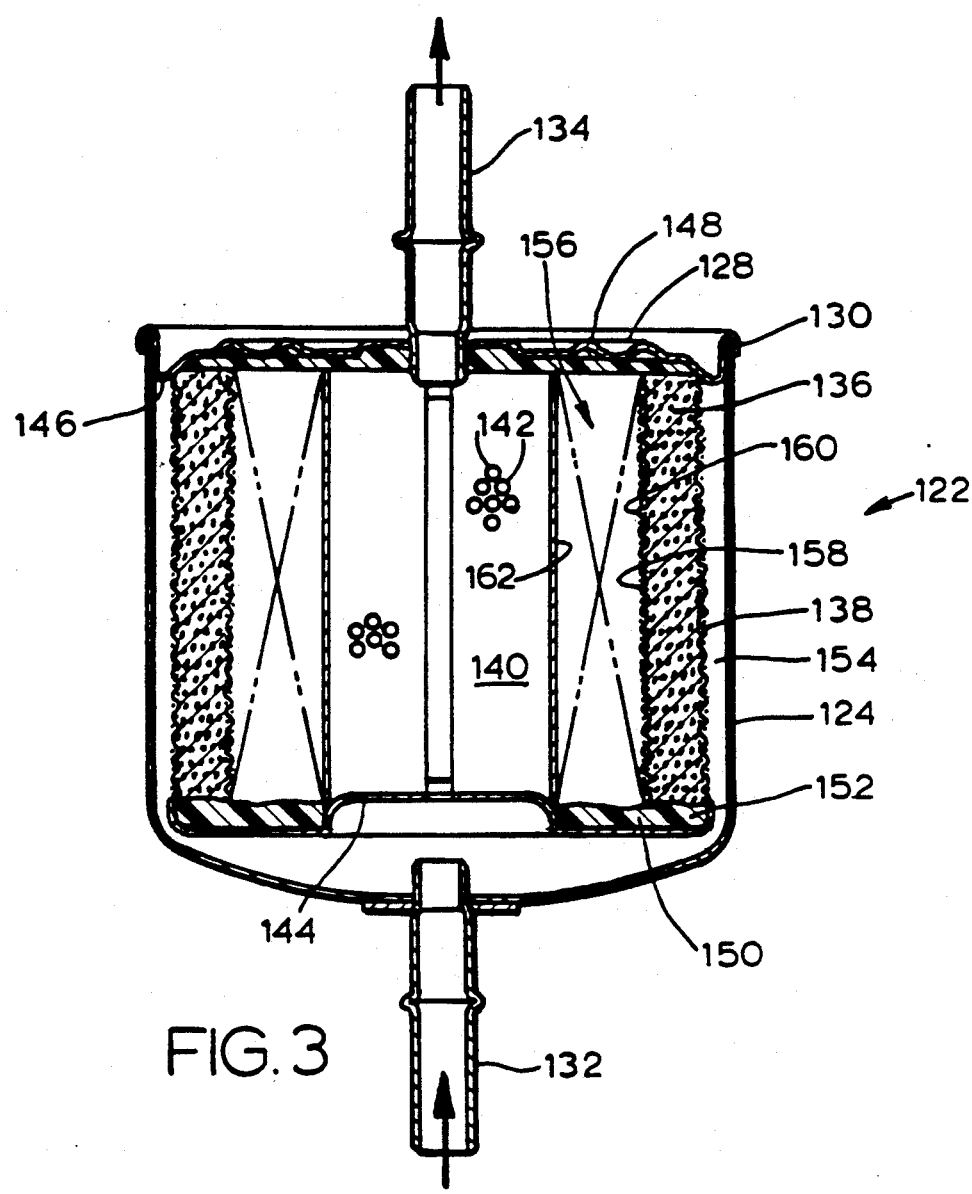
FIG. 3 is a view similar to FIG. 2 in which the sorbent is placed within a conventional fuel filter.
Figure 1:
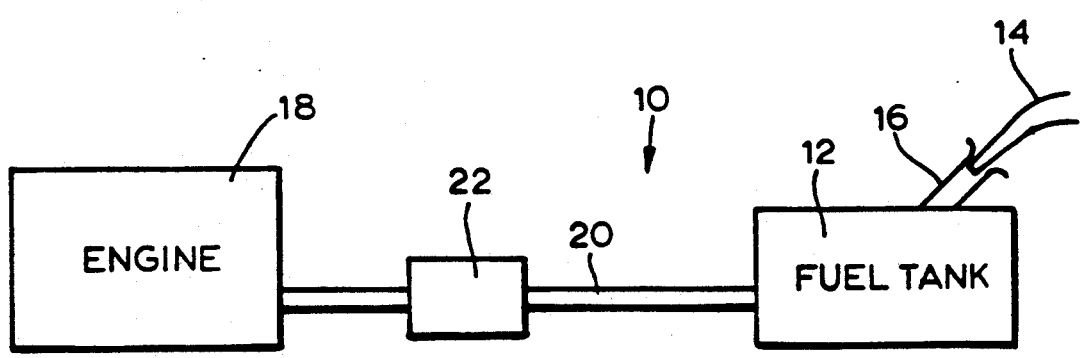

Referring now to the drawings, a motor vehicle fueling system generally indicated by the numeral 10 includes a vehicle fuel tank 12 which is filled from a filling station fuel dispenser 14 through a filler tube 16. Fuel is transferred from the fuel tank 12 to the vehicle engine 18 through a fuel line 20. According to the present invention, a device 22 is included in the fuel line 20 between the fuel tank 12 and the engine 18 for removing PNAs from the fuel before it is combusted in the engine 18. The treatment device 22 may be as indicated in either FIG. 2 or FIG. 3, but when the device in FIG. 2 is used, a conventional fuel filter (not shown) is placed in the fuel line 20 in series with the device 22.

Figure 2:
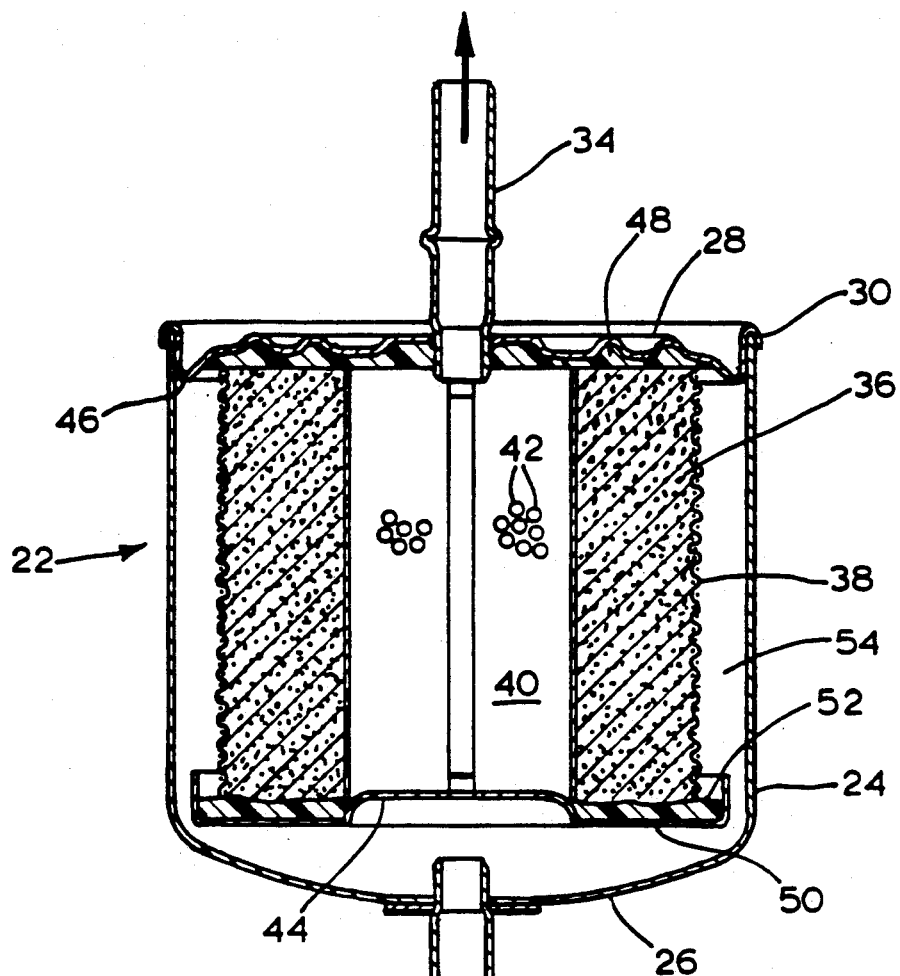
FIG. 2 is a cross-sectional view of a filter including a sorbent for absorbing PNAs from motor vehicle fuel.

Referring now to FIG. 2, the treatment device 22 includes a cup-shaped sheet metal housing comprising a circumferentially extending wall 24 and an end wall 26. A transversely extending closure member 28 is crimped to the end of the circumferentially extending wall 24 as at 30 to thereby close the open end of the cup-shaped housing. An inlet fitting 32 extends through the wall 26, and an outlet fitting 34 extends through the closure member 28. The inlet and outlet fittings 32, 34 are connected in the fuel line 20.

According to the invention, substantially all the fuel communicated into the inlet 32 is also communicated through a sorbent generally indicated by the numeral 36, which removes the aforementioned PNAs from the fuel. As clearly illustrated in FIG. 2, the sorbent 36, which, as discussed hereinabove, is preferably activated charcoal, is in granular form and is disposed between an outer fluid permeable wire mesh screen generally indicated by the numeral 38 and a circumferentially extending centertube 40, which is concentric with the screen 38, to thereby define an annular cylinder in which the activated charcoal 36 is contained, thus forming the activated charcoal 36 into the shape of an annular cylinder. The activated charcoal can also be formed as a free standing sleeve thereby eliminating the screens. The centertube 40 is provided with spaced perforations as at 42 so that fuel flowing through the screen 38 and through the activated charcoal 36 also flows through the perforations 42 and out of the outlet fitting 34 which is in communication with the annular chamber defined by the centertube 40. A closed end cap 44 bridges the open end of the centertube 40, and cooperates with the closure member 28, which bridges the opposite end of the centertube 40, to thereby close opposite ends of the centertube 40 whereby fuel communicated through the sorbent 36 is received and communicated out of the outlet fitting 34.

The closure member 28 is provided with a circumferentially extending rim 46, and a sealing compound 48 is dispensed in the recessed portion of the closure member 28 defined by the rim 46. The corresponding ends of the centertube 40 and the screen 38 are embedded in the sealing material 48, thereby sealing the corresponding end of the annular cylinder containing the sorbent 36. Similarly, a circumferentially extending trough 50 is formed in the end cap 44, which receives a sealant material 52 into which the corresponding ends of the screen 38 and the centertube 40 are embedded to thereby seal the opposite end of the annular cylinder forming the container for the sorbent 36. Therefore, substantially all of the fuel flowing into the inlet fitting 32 is received in annular chamber 54, from which it passes through the screen 38 and into the sorbent material 36, and then through the perforations 42 into the chamber defined by the centertube 40. As discussed hereinabove, fuel flows from the centertube through the outlet fitting 34 to the engine 18.

The granules forming the sorbent 36 are of sufficient size that they will not pass through the opening in the wire mesh screen 38 or the openings 42 in the centertube 40. However, preferably a conventional fuel filter (not shown) is placed in the fuel line 20 between the device 22 and the engine 18 for filtering any other contaminants that might be contained with the fuel, and also to capture any of the granules 36 which might be small enough to pass through the openings 42 and become entrained in the fuel. Although the quantity of the activated charcoal sorbent 36 has not been determined, the aforementioned prior art reference discloses that from 50 to 150 grains of activated charcoal is necessary to remove PNAs from the lubricating oil directly, and it is assumed that a similar quantity of the sorbent 36 will be necessary in the device 22.

Referring now to the embodiment of FIG. 3, elements substantially the same as those in the embodiment of FIG. 2 retain the same reference numeral, but increased by 100. The embodiment of FIG. 3 includes both the sorbent 136 and a conventional pleated paper filter element generally indicated by the numeral 156, so that a separate conventional fuel filter in the fuel line 20 is not required. Other filtering materials, such as porous plastic or sintered metal elements may also be used. In the embodiment of FIG. 3, the pleated paper element 156 is disposed within an annular cylinder cylindrical space defined between the centertube 140 and inner screen 158, which cooperates with the screen 138 to define the annular cylinder receiving the sorbent 136. The filtering media 156 is a conventional circumferentially extending array of radially tapering pleats, in which the filter paper tapers radially between the outer tip area 160 and the inner tip are 162. Accordingly, the centertube 140 circumscribes the inner tips 162, and the screen 158 circumscribes the radial outer tips 160. The screen 158 is embedded in the sealant 128, 152, as are the corresponding ends of the pleats comprising the filtering media 156, so that fuel communicated into the chamber 154 from inlet fitting 132 cannot bypass around the sorbent 136 or the pleats comprising the media 156, and instead must flow first through the activated charcoal sorbent 136 and then through the filtering media 156. Accordingly, the PNAs are absorbed by the sorbent 136 before the fuel is communicated through the filtering media 158, which removes any contaminants entrained in the fuel as well as any of the sorbent 136 that might be dislodged and accidentally passed through the screen 158.

Figure 4:
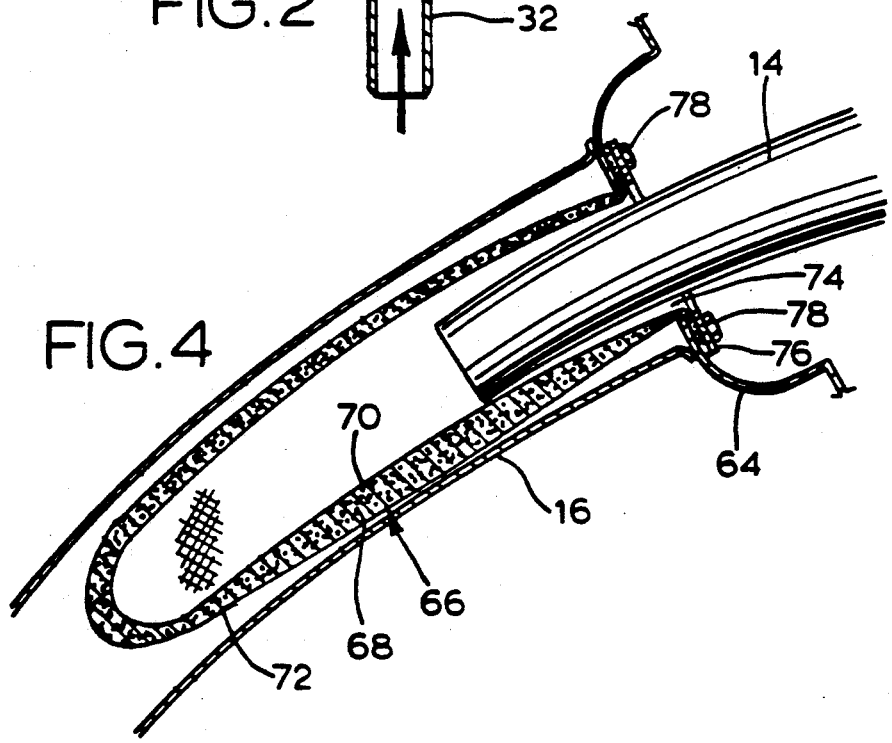
FIG. 4 is a cross-sectional view taken through the fuel filter tube of a vehicle in which the sorbent material is placed in the filler tube for treatment of the motor vehicle fuel as the vehicle is fueled.

The activated charcoal sorbent may also be disposed in the filter tube 16, so that PNAs may be removed as the vehicle is fueled. Referring now to FIG. 4, the filler tube 16 is attached to a flared portion 64, which is a part of the vehicle body and which receives the fuel dispenser 14 when the vehicle is fueled. Instead of installing a treatment device 22 in the fuel line 20, the PNAs may be removed from the fuel by providing a bag generally indicated by the numeral 66, which contains activated charcoal granules 68 between an inner cloth or flexible wire screen 70 and a corresponding outer screen 72. The open end 74 of the bag 66 receives the fuel dispenser 14. The ends of the screens 70, 72 are secured to a circumferentially extending member 76, which is removably secured to flared portion 64 by fasteners 78. Accordingly, the bag 66 may be removed and replaced when the sorbent 68 is spent by removing the fastener 78 and thereby removing the bag 66 and installing a new bag. Accordingly, the fuel dispensed through the dispenser 44 will pass through the bag 66 and through the activated charcoal sorbent 68, as it is dispensed into the filler tube 16 which communicates with the fuel tank 12.

I claim:

1. Fueling system for supplying fuel to the engine of a vehicle, said fueling system including a fuel filler tube for receiving fuel from a fuel dispenser and communicating said fuel to a fuel tank, a fuel line for communicating fuel from said fuel tank to said engine, and an activated carbon sorbent within said fueling system for removing polynuclear aromatic hydrocarbon compounds from said fuel as said fuel is communicated within said fueling system before said fuel is combusted in said engine.

2. Fueling system as claimed in claim 1, wherein said fueling system includes a filter including a housing having an inlet and an outlet communicated in said fuel line, said sorbent being mounted in said housing between the inlet and outlet thereof whereby substantially all of the fuel communicated into said inlet is also communicated through the sorbent.

3. Fueling system as claimed in claim 2, wherein said sorbent is in the form of an annular cylinder within said housing, said cylinder being defined by an annular wall having an outer circumferential surface cooperating with said housing to define a first chamber and an inner circumferential surface defining a second chamber, one of said chambers being communicated with said inlet, the other chamber being communicated to the outlet, said fuel being communicated from said one chamber to the other chamber through the annular wall.

4. Fueling system as claimed in claim 3, wherein said filter includes a pleated filtering media comprising a circumferentially extending array of radially tapering pleats having inner and outer tips, said annular cylinder circumscribing the outer tips of said pleats whereby said fuel is first communicated through the annular wall and then through said filtering media.

5. Fueling system as claimed in claim 4, wherein said annular cylinder is defined between inner and outer concentric screens, said sorbent being in granular form and confined between said screens.

6. Fueling system as claimed in claim 3, wherein said annular cylinder is defined between inner and outer concentric screens, said sorbent being in granular form and confined between said screens.

7. Fueling system as claimed in claim 1, wherein said sorbent is in granular form and is confined between inner and outer porous members through which said fuel passes.

8. Fueling system as claimed in claim 7, wherein said sorbent is located in said filler tube and said inner porous member receives said fuel dispenser.

9. Fuel filter for the fueling system of an automotive vehicle powered by an internal combustion engine, said fueling system including a fuel line for delivering fuel to said engine, said fuel filter comprising a housing having an inlet connected in said fuel line for receiving fuel and an outlet connected in said fuel line through which fuel is communicated to said internal combustion engine, said housing defining a flow path between the inlet and outlet for communicating fuel from said inlet to said outlet, and an activated charcoal sorbent for removing polynuclear aromatic hydrocarbon compounds from said fuel, said sorbent being located within said housing in said flow path, said flow path including means for directing substantially all of the fuel communicated through said inlet through the sorbent.

10. Fuel filter as claimed in claim 9, wherein said sorbent is in the form of an annular cylinder within said flow path, said cylinder being defined by an annular wall, said flow path extending through said annular wall.

11. Fuel filter as claimed in claim 10, wherein a pleated filtering media comprising a circumferentially extending array of radially tapering pleats having inner and outer tips is located within said housing, said annular cylinder circumscribing the outer tips of said pleats whereby said flow path extends from said inlet first through the annular wall and then through said filtering media.

12. Fuel filter as claimed in claim 11, wherein said annular cylinder is defined between inner and outer concentric screens, said sorbent being in granular form and confined between said screens.

13. Fuel filter as claimed in claim 10, wherein said annular wall has an outer circumferential surface cooperating with said housing to define a first chamber and an inner circumferential surface defining a second chamber, one of said chambers being communicated with said inlet, the other chamber being communicated to the outlet, said flow path extending from said one chamber through said annular wall and into the other chamber.

14. Fuel filter as claimed in claim 10, wherein said annular cylinder is defined between inner and outer concentric screens, said sorbent being in granular form and confined between said screens.

15. Fuel filter for an internal combustion engine comprising a housing having an inlet for receiving fuel and an outlet through which fuel is communicated to said internal combustion engine, said housing defining a flow path between the inlet and outlet for communicating fuel from said inlet to said outlet, an activated charcoal sorbent for removing polynuclear aromatic hydrocarbon compounds from said fuel, said sorbent being located within said housing in said flow path so that substantially all of the fuel communicated through said inlet is also communicated through the sorbent, and filtering media for removing contaminants from said fuel mounted in said housing downstream from said sorbent whereby said fuel communicated from said inlet first through said sorbent and then through said filtering media.

16. Fuel filter as claimed in claim 15, wherein said sorbent is in granular form, and fuel permeable wall means within said housing for retaining said sorbent while permitting said fuel to contact said sorbent by passing through said wall means.

* * * * *